Figure 1:
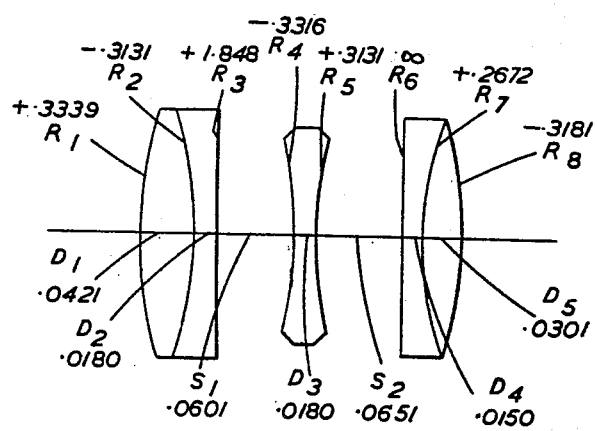
Figure 2:
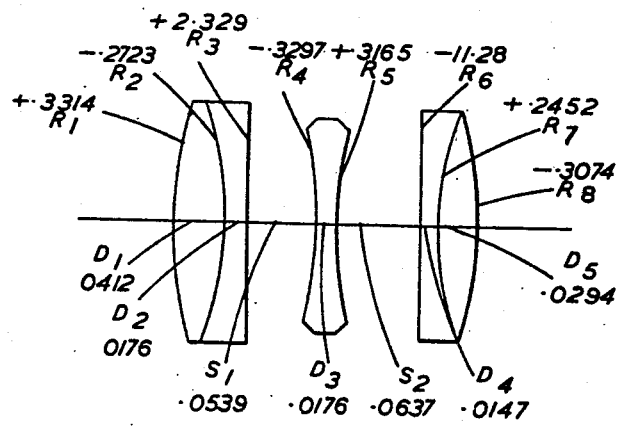

March 18, 1947.    A. COX    2,417,736
OPTICAL OBJECTIVES
Filed May 19, 1944

Inventor
A. Cox,
By
Attorneys

Patented Mar. 18, 1947

2,417,736

UNITED STATES PATENT OFFICE 2,417,736

OPTICAL OBJECTIVE

Arthur Cox, Leicester, England, assignor to Taylor, Taylor & Hobson Limited, Leicester, England, a company of Great Britain Application May 19, 1944, Serial No. 536,375
In Great Britain April 12, 1943

16 Claims. (Cl. 88—57)

This invention relates to an optical objective of the kind comprising a simple divergent component located between two compound convergent components, each comprising a biconvex convergent element cemented to a divergent element made of a material having lower mean refractive index and lower Abbé V number than that of the associated convergent element, the contact surface in each compound component being convex towards the divergent middle component.

The present invention has for its object to provide an objective of this kind having a very high degree of correction for spherical and chromatic aberrations, coma, astigmatism, field curvature and distortion as well as for oblique spherical aberration, for a comparatively low aperture, say F/6.3, and for a comparatively narrow semi-angular field, say 16°, and having high resolving power when made up in long focal lengths.

In the accompanying drawings are illustrated diagrammatically two examples of optical objectives illustrating the present invention.

In the objective according to the invention the materials of which the two elements of the convergent front component are made differ in mean refractive index by not less than .055, the radius of curvature of the contact surface between them lying between .25 and .40 times the equivalent focal length of the objective. The Abbé V number of the material used for the convergent element of such component preferably exceeds that of the divergent element thereof by more than 4 and less than 10. It is to be understood that the term "front" is herein used to refer to the side of the objective nearer to the longer conjugate.

It is desirable to have a low Petzval sum, say not greater than .185 times the equivalent power of the objective (that is the reciprocal of the equivalent focal length of the objective). The overall axial length of the objective should preferably be low, say between .175 and .325 times the equivalent focal length of the objective. With this feature other desirable features are that the axial air separation between the middle and rear components is not greater than 1.5 times that between the front and middle components, that the ratio between the radii of curvature of the two surfaces of the divergent middle component lies between .75 and 1.33, that the axial air separation between the front two components is not less than .04 times the equivalent focal length of the objective, and that the difference between the Abbé V numbers of the materials used for the two elements of the front component lies between 4 and 10.

The radius of curvature of the contact surface in the convergent rear component preferably lies between .22 and .32 times the equivalent focal length of the objective. The numerical sum of the radii of curvature of the front surface of the front component and the rear surface of the rear component may conveniently lie between .60 and .74 times the equivalent focal length of the objective, and that of the radii of the two surfaces of the divergent middle component may conveniently lie between .60 and .80 times such equivalent focal length.

A preferred practical construction of objective according to the invention is illustrated in the accompanying drawing, and numerical data for two convenient practical examples of this construction are given in the following tables, in which $R_1$, $R_2$ . . . represent the radii of curvature of the individual surfaces counting from the front (the positive sign indicating that the surface is convex to the front and the negative sign that it is concave thereto), $D_1$, $D_2$ . . . represent the axial thickness of the various elements, and $S_1$, $S_2$ represent the axial air separations between the components. The tables also give the mean refractive indices for the D-line and the Abbé V numbers of the materials used for the individual elements.

*Example I*

| Equivalent focal length 1.000 | | Relative aperture F/6.3 | |
|---|---|---|---|
| Radius | Thickness or air separation | Refractive index $n_D$ | Abb⁵ V number |
| $R_1+.3339$ | $D_1$ .0421 | 1.613 | 57.6 |
| $R_2-.3131$ | $D_2$ .0180 | 1.530 | 51.9 |
| $R_3+1.848$ | $S_1$ .0601 | | |
| $R_4-.3316$ | $D_3$ .0180 | 1.547 | 45.7 |
| $R_5+.3131$ | $S_2$ .0651 | | |
| $R_6$ ∞ | $D_4$ .0150 | 1.547 | 45.7 |
| $R_7+.2672$ | $D_5$ .0301 | 1.613 | 57.6 |
| $R_8-.3181$ | | | |

*Example II*

| Equivalent focal length 1.000 | | Relative aperture F/6.3 | |
|---|---|---|---|
| Radius | Thickness or air separation | Refractive index $n_D$ | Abbé V number |
| $R_1 +.3314$ | | | |
| | $D_1$ .0412 | 1.653 | 46.2 |
| $R_2 -.2723$ | | | |
| | $D_2$ .0176 | 1.579 | 41.2 |
| $R_3 +2.329$ | | | |
| | $S_1$ .0539 | | |
| $R_4 -.3297$ | | | |
| | $D_3$ .0176 | 1.613 | 36.9 |
| $R_5 +.3165$ | | | |
| | $S_2$ .0637 | | |
| $R_6 -11.28$ | | | |
| | $D_4$ .0147 | 1.579 | 41.2 |
| $R_7 +.2452$ | | | |
| | $D_5$ .0294 | 1.644 | 48.3 |
| $R_8 -.3074$ | | | |

The back focal length is in Example I .8970 and in Example II .9097 times the equivalent focal length, and the Petzval sum is in Example I .147 and in Example II .137 times the equivalent power of the objective. Both the first order and the higher order coma are reduced to negligible amounts in each example.

It will be noticed that the overall axial length of the objective amounts in Example I to .2484 and in Example II to .2381 times the equivalent focal length. The ratio of $S_2$ to $S_1$ is about 1.08 in Example I and 1.18 in Example II. The ratio of $R_5$ to $R_4$ is about .94 in Example I and .96 in Example II, and the numerical sum of these radii is .6647 in Example I and .6462 in Example II times the equivalent focal length. The numerical sum of the radii $R_1$ and $R_8$ amounts in Example I to .6520 and in Example II to .6388.

What I claim as my invention and desire to secure by Letters Patent is:

1. An optical objective, corrected for spherical and chromatic aberrations, coma, astigmatism, field curvature and distortion, and comprising a simple divergent component, and two compound convergent components located one on each side of such divergent component and each consisting of a biconvex convergent element cemented to a divergent element made of a material having lower mean refractive index and lower Abbé V number than that of the associated convergent element, the two cemented surfaces each being convex towards the middle component, the radius of curvature of the cemented surface in the front component lying between .25 and .40 times the equivalent focal length of the objective, whilst the difference between the refractive indices of the materials on either side of such surface is not less than .055, the Petzval sum of the objective being not greater than .185 times the equivalent power of the objective, while the numerical sum of the radii of curvature of the two surfaces of the divergent middle component lies between .60 and .80 times the equivalent focal length of the objective.

2. An optical objective, corrected for spherical and chromatic aberrations, coma, astigmatism, field curvature and distortion, and comprising a simple divergent component, a rear compound convergent component located behind such divergent component and consisting of a biconvex convergent element cemented behind a divergent element made of a material having lower mean refractive index and lower Abbé V number than that of the associated convergent element, and a front compound convergent component located in front of the simple divergent component and consisting of a biconvex convergent element cemented in front of a divergent element, the radius of curvature of such cemented surface lying between .25 and .40 times the equivalent focal length of the objective, whilst the material used for the biconvex element of the front component has refractive index exceeding by not less than .055 and Abbé V number exceeding by more than 4 and less than 10 the refractive index and the Abbé V number respectively of the material used for the associated divergent element, the Petzval sum of the objective being not greater than .185 times the equivalent power of the objective, while the numerical sum of the radii of curvature of the two surfaces of the divergent middle component lies between .60 and .80 times the equivalent focal length of the objective.

3. An optical objective as claimed in claim 2, in which the overall axial length of the objective lies between .175 and .325 times the equivalent focal length of the objective.

4. An optical objective, corrected for spherical and chromatic aberrations, coma, astigmatism, field curvature and distortion, and comprising a simple divergent component, and two compound convergent components located one on each side of such divergent component and each consisting of a biconvex convergent element cemented to a divergent element made of a material having lower mean refractive index and lower Abbé V number than that of the associated convergent element, the two cemented surfaces each being convex towards the middle component, the radius of curvature of the cemented surface in the front component lying between .25 and .40 times the equivalent focal length of the objective, whilst the difference between the refractive indices of the materials on either side of such surface is not less than .055, the overall axial length of the objective lying between .175 and .325 times the equivalent focal length of the objective, while the Petzval sum of the objective is not greater than .185 times the equivalent power of the objective.

5. An optical objective as claimed in claim 4, in which the axial air separation between the middle and rear components is not greater than 1.5 times that between the front and middle components.

6. An optical objective as claimed in claim 4, in which the ratio between the radii of curvature of the two surfaces of the divergent middle component lies between .75 and 1.33.

7. An optical objective as claimed in claim 2, in which the overall axial length of the objective lies between .175 and .325 times the equivalent focal length of the objective, and the axial air separation between the middle and rear components is not greater than 1.5 times that between the front and middle components, whilst the ratio between the radii of curvature of the two surfaces of the divergent middle component lies between .75 and 1.33.

8. An optical objective as claimed in claim 1, in which the axial air separation between the front and middle components is not less than .04 times the equivalent focal length of the objective.

9. An optical objective as claimed in claim 2, in which the axial air separation between the front and middle components is not less than .04 times the equivalent focal length of the objective.

10. An optical objective as claimed in claim 4, in which the axial air separation between front and middle components is not less than .04 times the equivalent focal length of the objective.

11. An optical objective, as claimed in claim 1, in which the axial air separation between the front and middle components is not less than .04 times the equivalent focal length of the objective, and the radius of curvature of the contact surface in the convergent rear component lies between .22 and .32 times the equivalent focal length of the objective.

12. An optical objective as claimed in claim 1, in which the numerical sum of the radii of curvature of the front surface of the front component and the rear surface of the rear component lies between .60 and .74 times the equivalent focal length of the objective.

13. An optical objective as claimed in claim 2, in which the numerical sum of the radii of curvature of the front surface of the front component and the rear surface of the rear component lies between .60 and .74 times the equivalent focal length of the objective.

14. An optical objective as claimed in claim 4, in which the numerical sum of the radii of curvature of the front component and the rear surface of the rear component lies between .60 and .74 times the equivalent focal length of the objective.

15. An optical objective as claimed in claim 4, in which the numerical sum of the radii of curvature of the two surfaces of the divergent middle component lies between .60 and .80 times the equivalent focal length of the objective.

16. An optical objective as claimed in claim 4, in which the numerical sum of the radii of curvature of the two surfaces of the divergent middle component lies between .60 and .80 times the equivalent focal length of the objective, and the ratio between such radii lies between .75 and 1.33.

ARTHUR COX.

REFERENCES CITED

The following references are of record in the file of this patent:

UNITED STATES PATENTS

| Number | Name | Date |
|---|---|---|
| 765,006 | Harting | July 12, 1904 |
| 1,421,156 | Booth | June 27, 1922 |
| 2,279,384 | Altman | Apr. 14, 1942 |
| 716,035 | Harting | Dec. 16, 1902 |
| 2,336,301 | Schade et al. | Dec. 7, 1943 |